Aug. 16, 1927.  
J. W. WOODRUFF  
1,639,017  
AUTOMATIC FORCE FEED LUBRICATOR  
Filed April 21, 1926  
2 Sheets-Sheet 1

INVENTOR  
Joseph H. Woodruff,  
BY  
Everett Cook,  
ATTORNEYS.

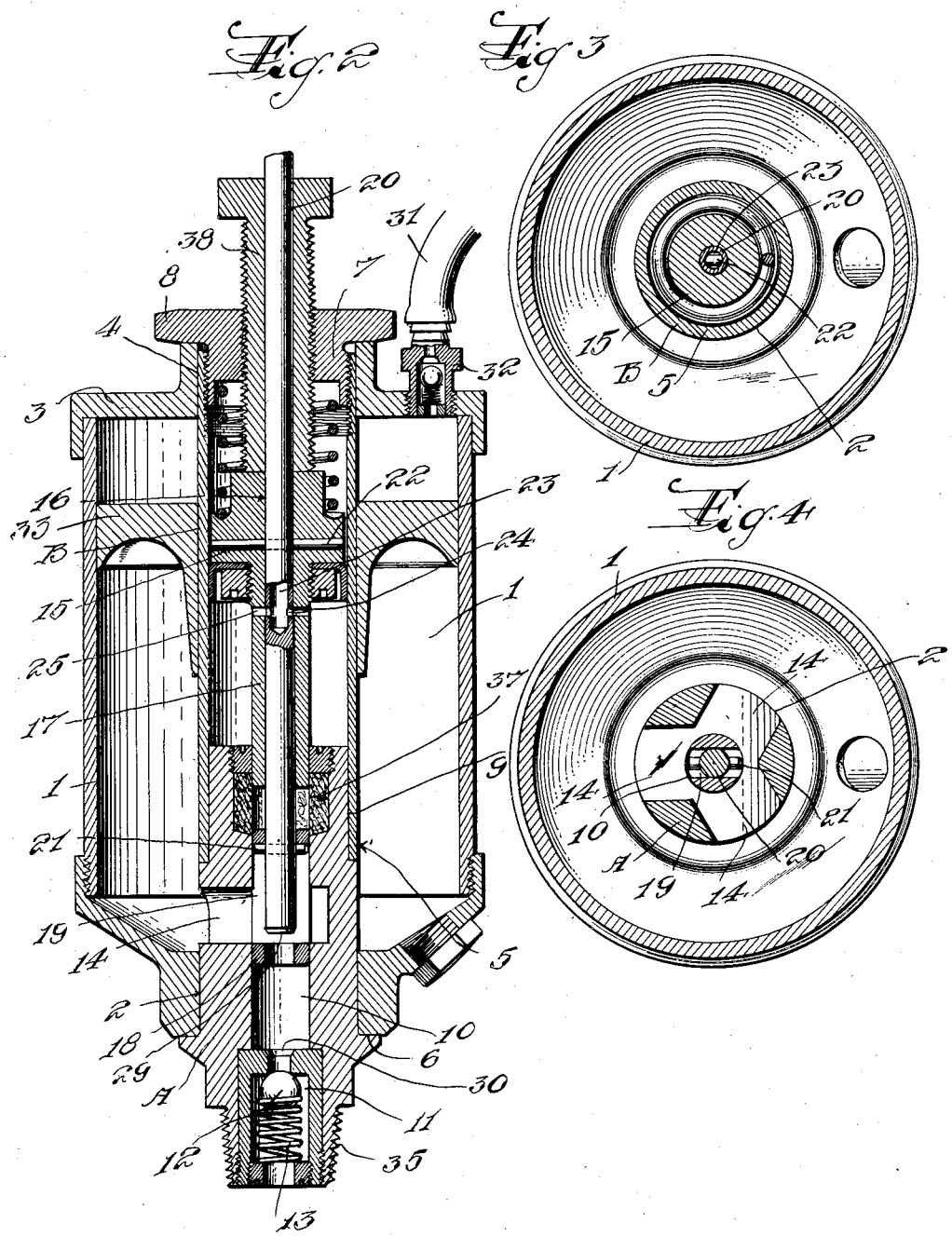

Patented Aug. 16, 1927.

1,639,017

UNITED STATES PATENT OFFICE.

JOSEPH W. WOODRUFF, OF ELIZABETH, NEW JERSEY.

AUTOMATIC FORCE-FEED LUBRICATOR.

Application filed April 21, 1926. Serial No. 103,487.

This invention relates in general to a lubricating device of the type in which the lubricant is discharged from a receptacle by force, as by a follower piston operated by power such as compressed air. More particularly the invention relates to such a device especially adapted for use with heavy or unusually viscous greases, such as are used in large machinery operating under heavy loads.

One object of the invention is to provide a lubricating device of the character described wherein the means for ejecting the lubricant such as heavy grease, from the receptacle is required to operate upon and move only the relatively small amount of grease which it is desired to deliver to a bearing or the like at any one time, so that the power may be directly applied to the grease to be moved and only a small amount of power is required.

Another object is to provide such a lubricating device comprising a large reservoir or receptacle for the grease and an auxiliary discharge chamber communicating with said reservoir, with power operated means for forcing a limited quantity of the grease from the reservoir into said discharge chamber, and a power operated means such as a piston for ejecting said limited quantity of grease from said auxiliary chamber, whereby a sufficient amount of power may be applied for forcibly supplying the grease to a bearing or the like and without the necessity of providing sufficient power for moving the whole body of grease within the reservoir under such pressure as would properly supply the grease to the bearing.

A further object is to provide a lubricating device of this character in which the power operated means for discharging the grease from the auxiliary discharge chamber includes a valve for controlling the supply of grease from the reservoir to the auxiliary chamber and which also normally closes the discharge outlet of the lubricating device, whereby the grease may be supplied to the bearing or the like only at predetermined intervals depending upon operation of said power operated means and valve.

Other objects are to provide in such a lubricating device fluid pressure operated means for opening said valve and raising the piston from the auxiliary discharge chamber to permit grease to flow from the reservoir into said auxiliary chamber, and a spring or other power means for closing said valve and moving said piston into the auxiliary chamber to discharge the grease therefrom; to provide in such a device a fluid pressure operated piston or follower in the reservoir for forcing the grease from the reservoir into said auxiliary chamber; to provide means whereby said piston and valve and said follower piston in the reservoir are simultaneously actuated to cause grease to be forced from the reservoir into said auxiliary chamber; to provide a lubricating device for handling heavy greases which shall be simple, inexpensive and reliable in construction and operation, and to obtain other results and advantages as may be brought out by the following description.

Referring to the accompanying drawings, in which corresponding and like parts are designated throughout the several views by the same reference characters, Figure 1 is a vertical sectional view through a lubricating device constructed in accordance with the invention, showing the parts in normal position with the discharge valve closed;

Figure 2 is a similar view showing the parts in operation to permit grease to be forced from the reservoir into the auxiliary discharge chamber;

Figure 3 is a horizontal sectional view, taken on the line 3—3 of Figure 1, and

Figure 4 is a horizontal sectional view, taken on the line 4—4 of Figure 1.

Figure 1:
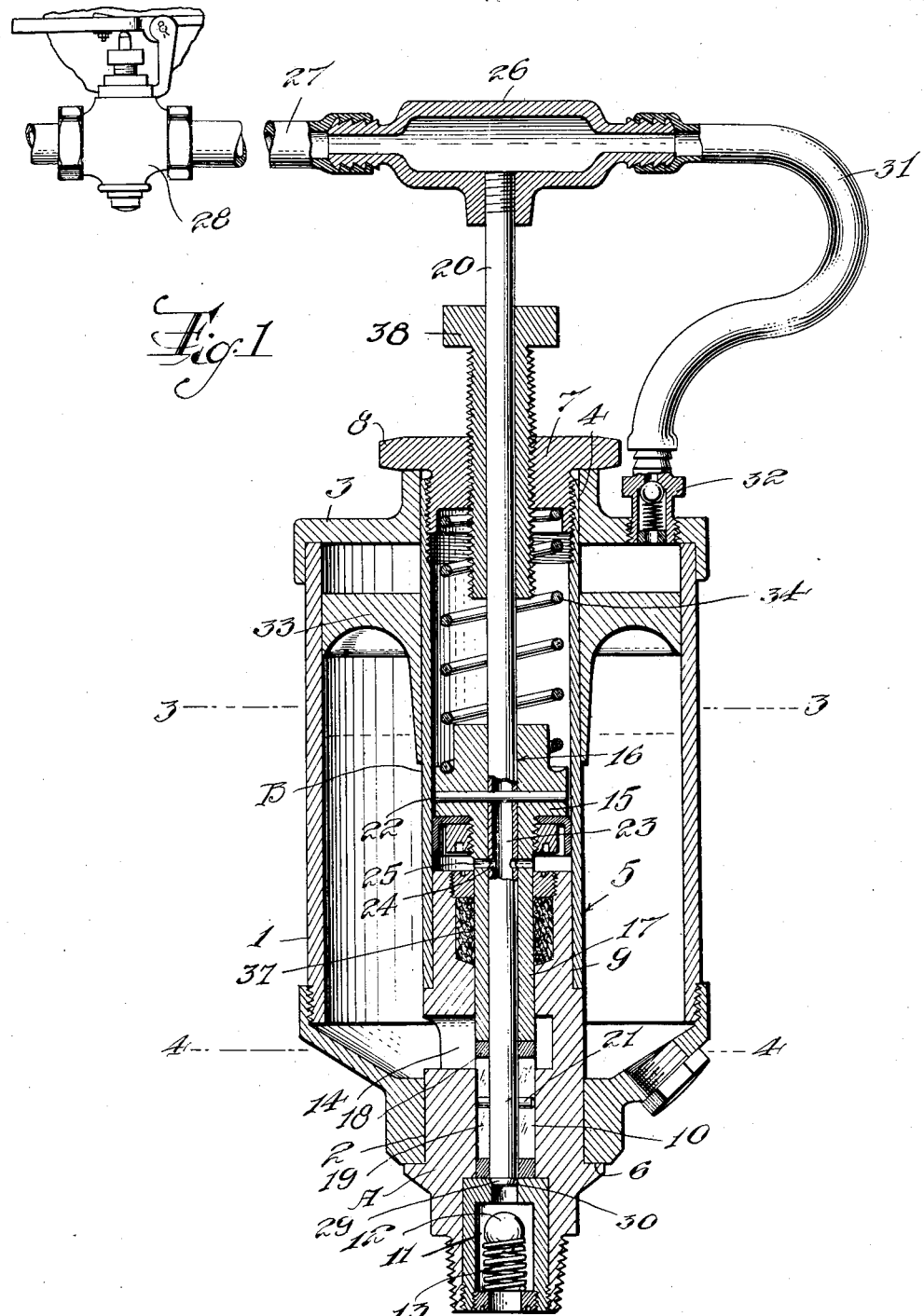

Specifically describing the illustrated embodiment of the invention, the reference character 1 designates a main reservoir to receive a lubricant such as grease, said reservoir being preferably cylindrical and having at one end a co-axial opening 2. The other end of the reservoir is normally closed by a cover 3 having a co-axial opening 4 of substantially the same diameter as the opening 2.

A cylinder 5 extends longitudinally through the reservoir 1 and projects from the openings 2 and 4, said cylinder having a flange 6 at the end in the opening 2 to abut against the end of the reservoir and limit movement of the cylinder into the same, while the other end of the cylinder has a screw threaded plug 7 therein provided with a flange 8 adapted to abut the cover 3 around the opening 4. Obviously, by tightening the plug 7, the cylinder will be drawn into the reservoir to cause tight engagement of the flange 6 on the cylinder and the flange 8 on the cover 3 so that the cylinder is fixedly mounted within the reservoir. The cylinder is formed in two pieces A and B which are fixedly secured together as at 9 by brazing, welding, or in any other suitable manner, and the section A is formed with a co-axial opening 10 communicating with a valve chamber 11 in which is arranged an outwardly ball check valve 12 normally seated by a spring 13. Intermediate the ends of the opening 10, within the reservoir 1, the section A of the cylinder is provided with a plurality of transverse radial openings 14 communicating with the opening 10.

A motor piston 15 is reciprocably mounted in the other section B of the cylinder and has a co-axial opening 16 and a co-axial tubular extension 17, the latter of which has a sliding fit with the opening 10 in the section A. A valve sleeve 18 is reciprocable within the opening 10 between the piston 15 and the valve chamber 11, said sleeve having transverse openings 19 and being of a length so that said openings communicate with the openings 14 in the cylinder when said sleeve rests against the inner end of the valve chamber 11, as shown in Figure 1 of the drawings. A rod 20 is fixedly secured by a pin 22 in the opening 16 of the piston 15 and reciprocable in the sleeve 18, and has a transverse pin 21 arranged in the slots 19 of said sleeve 18 whereby said piston 15 and rod may move relatively to and longitudinally of the sleeve 18. The outer end portion of the rod 20 is provided with a longitudinal passage 23 which communicates at its inner end with transverse ports 24 in the rod and registering ports 25 in the extension 17 of the piston, said ports being arranged beneath the piston, as clearly shown in the drawings. The outer extremity of said rod is connected by a coupling 26 to a flexible tube 27 which is in turn connected through a valve 28 to a source of compressed air. The inner end of the rod 20 is formed with a beveled head 29 adapted to normally rest upon a seat 30 at the discharge end of the opening 10 in the cylinder 5. A compression spring 34 is interposed between the piston 15 and the plug 7 for normally forcing the piston inwardly to cause engagement of the head 29 with the seat 30, as shown in Figure 1. The coupling 26 is also connected to a flexible tube 31 which is in turn connected to an inwardly opening check valve 32 in the cover 3 of the reservoir 1. A follower piston 33 is arranged in said reservoir and is adapted to normally rest upon the top of the lubricant therein.

The valve 28 may be of any suitable construction, but it is preferably of the type shown and described in my copending application Serial No. 76,159, filed December 18, 1925, whereby air is periodically supplied to and released from the passage 23 in the rod 20 and the reservoir above the follower piston 33 through the valve 32.

In operation of the device, the parts are normally in the position shown in Figure 1. When the valve 28 is operated to supply compressed air to the coupling 26, the air passes through the passage 23, ports 24 and 25 into the cylinder 5 beneath the piston 15, so that the piston is forced upwardly and initially removes the head 29 of the rod 20 from the seat 30 and then through engagement of the pin 21 with the ends of the slots 19 and moves the sleeve 18 upwardly into the position shown in Figure 2 of the drawings. At the same time, the compressed air acts upon the follower piston 33 so that some of the grease in the reservoir is forced through the openings 14 in the cylinder, the slots 19 and the sleeve 18 into the opening 10 between the valve chamber 11 and the sleeve 18. The duration of this operation may be suitably determined and controlled by operation of the valve 28. When said valve is operated to shut off the air supply, the spring 34 forces the piston 15 downwardly so that the end 29 of the rod initially closes the corresponding end of the sleeve 18, after which the end of the extension 17 of the piston engages the sleeve 18, and the piston 15 and said sleeve move together downwardly into the opening 10. The grease in said opening is thus ejected under pressure of the spring through the valve chamber 11, opening the valve 12, and with the lubricator applied to a bearing, the grease is directly forced under sufficient pressure into and distributed throughout the bearing. The end 29 of the rod then engages the seat 30 and prevents further discharge of grease from the device. The lubricating device may be mounted upon a bearing by means of the screw threaded end 35 of the section A of the cylinder 5.

The portion of the opening 10 between the end of the sleeve 18 and the valve chamber 11 thus serves as an auxiliary discharge chamber, and power is applied through the sleeve 18 and rod 20 directly to the relatively small quantity of grease which has been previously forced into said auxiliary chamber by action of the compressed air upon the follower piston 33. This small quantity of grease can thus be effectively distributed through the bearing and with much less power than would be necessary to properly distribute the grease were the follower piston 33 and the power applied thereto utilized for forcing the grease directly into the bearing. It will be seen that the cooperation of the sleeve 18 and the rod 20 provides a combined valve and ejector piston, prevents formation of a vacuum in the auxiliary discharge chamber as the piston 15 is forced upwardly, and at the same time materially assists in drawing the grease from the reservoir through the openings 14 and slots 19 into said chamber.

Preferably a packing gland 37 is provided in the section A of the cylinder around the extension 17 of the piston and the sleeve 18. Also, means is preferably provided for varying the extent of movement of the piston 15, such means being shown in the drawing as consisting of a screw threaded sleeve 38 mounted in the plug 7 and slidably receiving the rod 20. By varying the distance to which the inner end of said sleeve projects into the cylinder, the extent of movement of the piston may be varied, the piston abutting against the end of said sleeve under the influence of the fluid pressure.

While I have shown and described the invention as embodied in certain details of construction, it will be understood that this is primarily for the purpose of illustrating the principles of the invention and that many modifications and changes may be made by those skilled in the art without departing from the spirit or scope of the invention. Therefore, I do not desire to be understood as limiting myself except as required by the following claims when construed in the light of the prior art.

Having thus described the invention, what I claim is:

1. A device of the character described, comprising a reservoir for lubricant, an auxiliary discharge chamber communicating with said reservoir and having an outlet, means for forcing lubricant from said reservoir into said discharge chamber, and a reciprocating valved ejector piston to force lubricant from said discharge chamber through said outlet, said ejector piston also serving to control said outlet and the movement of lubricant from said reservoir into said discharge chamber.

2. A device of the character described, comprising a cylinder having an outlet at one end and an opening in its walls intermediate its ends to admit a fluid to be pumped into said cylinder, a sleeve reciprocable in said cylinder and having an opening in its walls, a valve rod reciprocable in said sleeve having a valve to open and close said opening in said sleeve and projecting from one end of said cylinder, means for connecting said sleeve to said valve rod to permit limited movement of said valve rod relatively to said piston in opposite directions to open and close said opening and to cause movement of said piston with said valve rod after said valve has opened or closed said opening, a motor piston in said cylinder fixedly connected to said valve rod, said rod having a longitudinal passage for air from its outer end inwardly beneath said piston and transverse ports establishing communication between said passage and said cylinder beneath said piston, to actuate said motor piston, said valve rod and said sleeve in one direction.

3. A device of the character described, comprising a cylinder having an outlet at one end and an opening in its walls intermediate its ends to admit a fluid to be pumped into said cylinder, a sleeve reciprocable in said cylinder and having an opening in its walls, a valve rod reciprocable in said sleeve having a valve to open and close said opening in said sleeve and projecting from one end of said cylinder, means for connecting said sleeve in said valve rod to permit limited movement of said valve rod relatively to said piston in opposite directions to open and close said opening and to cause movement of said piston with said valve rod after said valve has opened or closed said opening, a motor piston in said cylinder fixedly connected to said valve rod, said rod having a longitudinal passage for air from its outer end inwardly beneath said piston and transverse ports establishing communication between said passage and said cylinder beneath said piston, to actuate said motor piston said valve rod and said sleeve in one direction, and a spring for actuating said piston, said valve rod and said sleeve in the opposite direction.

4. A device of the character described, comprising a reservoir for lubricant, a cylinder arranged in said reservoir having an outlet at one end and an opening intermediate its ends within said reservoir whereby lubricant may move from said reservoir into said cylinder, a sleeve reciprocable in said cylinder and having an opening in its walls, a valve rod reciprocable in said sleeve having a valve to open and close said opening in said sleeve and projecting from one end of said cylinder, means for connecting said sleeve to said valve rod to permit limited movement of said valve rod relatively to said piston in opposite directions to open and close said opening and to cause movement of said piston with said valve rod after said valve has opened or closed said opening, a motor piston in said cylinder fixedly connected to said valve rod, said rod having a longitudinal passage for air from its outer end inwardly beneath said piston and transverse ports establishing communication between said passage and said cylinder beneath said piston, to actuate said motor piston, said valve rod and said sleeve in one direction, and means for forcing lubricant from said reservoir into said cylinder simultaneous with the actuation of said motor piston in the direction to open said opening in said sleeve.

5. A device of the character described, comprising a reservoir for lubricant, a cylinder arranged in said reservoir having an outlet at one end and an opening intermediate its ends within said reservoir whereby lubricant may move from said reservoir into said cylinder, a sleeve reciprocable in said cylinder and having an opening in its walls, a valve rod reciprocable in said sleeve having a valve to open and close said opening in said sleeve and projecting from one end of said cylinder, means for connecting said sleeve to said valve rod to permit limited movement of said valve rod relatively to said piston in opposite directions to open and close said opening and to cause movement of said piston with said valve rod after said valve has opened or closed said opening, a motor piston in said cylinder fixedly connected to said valve rod, said rod having a longitudinal passage for air from its outer end inwardly beneath said piston and transverse ports establishing communication between said passage and said cylinder beneath said piston to actuate said motor piston, said valve rod and said sleeve in one direction, a follower piston mounted in said reservoir behind said lubricant, means for supplying fluid under pressure to said reservoir behind said follower piston to force said lubricant from said reservoir, and means for supplying fluid under pressure simultaneously to both said passage in said valve rod and said reservoir.

6. A device of the character described, comprising a cylinder having an outlet at one end and an opening in its walls intermediate its ends to admit a fluid to be pumped into said cylinder, a sleeve reciprocable in said cylinder, a valve rod reciprocable in said sleeve, a passage being provided between said opening in said cylinder and said discharge chamber opened and closed by relative movement of said sleeve and said valve rod in opposite directions respectively, a motor piston in said cylinder fixedly connected to said valve rod, said rod having a longitudinal passage for air from its outer end inwardly beneath said piston and transverse ports establishing communication between said passage and said cylinder beneath said piston, to actuate said motor piston, said valve rod and said sleeve in one direction.

7. A device of the character described, comprising a reservoir for lubricant, a cylinder arranged in said reservoir having an outlet at one end and an opening intermediate its ends within said reservoir whereby lubricant may move from said reservoir into said cylinder, a sleeve reciprocable in said cylinder, a valve rod reciprocable in said sleeve, a passage being provided between said opening in said cylinder and said discharge chamber opened and closed by relative movement of said sleeve and said valve rod in opposite directions respectively, a motor piston in said cylinder fixedly connected to said valve rod, said rod having a longitudinal passage for air from its outer end inwardly beneath said piston and transverse ports establishing communication between said passage and said cylinder beneath said piston, to actuate said motor piston, said valve rod and said sleeve in one direction, and means for forcing lubricant from said reservoir into said cylinder simultaneous with the actuation of said motor piston in the direction to open said passage.

JOSEPH W. WOODRUFF.